US011259609B2

(12) United States Patent
Francois

(10) Patent No.: US 11,259,609 B2
(45) Date of Patent: Mar. 1, 2022

(54) PROCESS FOR THE SELECTIVE DECORATION OF A TIMEPIECE COMPONENT

(71) Applicant: The Swatch Group Research and Development Ltd, Marin (CH)

(72) Inventor: Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 439 days.

(21) Appl. No.: 15/774,035

(22) PCT Filed: Oct. 20, 2016

(86) PCT No.: PCT/EP2016/075264
§ 371 (c)(1),
(2) Date: May 7, 2018

(87) PCT Pub. No.: WO2017/092927
PCT Pub. Date: Jun. 8, 2017

(65) Prior Publication Data
US 2018/0317616 A1 Nov. 8, 2018

(30) Foreign Application Priority Data
Nov. 30, 2015 (EP) .................................... 15196999

(51) Int. Cl.
*G04B 19/12* (2006.01)
*A44C 15/00* (2006.01)
(Continued)

(52) U.S. Cl.
CPC ............ *A44C 15/004* (2013.01); *A44C 27/00* (2013.01); *B44C 1/005* (2013.01); *C09K 9/00* (2013.01);
(Continued)

(58) Field of Classification Search
CPC .... G04B 45/00; G04B 45/0015; G04B 19/12; G04B 19/30; G04B 29/027; A44C 27/005;
(Continued)

(56) References Cited

U.S. PATENT DOCUMENTS 5,413,822 A 5/1995 Rey
5,430,692 A * 7/1995 Grupp .................... G04D 99/00
368/11
(Continued)

FOREIGN PATENT DOCUMENTS

| CH | 694 026 A5 | 6/2004 |
| EP | 0 600 307 A1 | 6/1994 |
| WO | WO 00/69303 A1 | 11/2000 |

OTHER PUBLICATIONS

International Search Report dated Nov. 18, 2016 in PCT/EP2016/075264 filed Oct. 20, 2016.

*Primary Examiner* — Sean Kayes
(74) *Attorney, Agent, or Firm* — Oblon, McClelland, Maier & Neustadt, L.L.P.

(57) ABSTRACT

A process for manufacturing a timepiece or jewellery component, the component being manufactured from a first material, the process including: obtaining the component, having undergone, at a very latest during the obtaining, a treatment directed toward combining the component with a chromic element, the chromic element including at least one pigment capable of reacting to an energy supply and a matrix for binding the pigment; placing the component in a machine capable of at least locally supplying energy to the component; using the energy supply machine in a predefined operating program at least locally to provide energy to the chromic element to bring about a reaction of its pigment; removing the component from the energy supply machine.

19 Claims, 2 Drawing Sheets

(51) Int. Cl.
*A44C 27/00* (2006.01)
*B44C 1/00* (2006.01)
*G04B 45/00* (2006.01)
*C09K 9/00* (2006.01)
*G04B 19/30* (2006.01)
*G04B 29/02* (2006.01)

(52) U.S. Cl.
CPC .......... *G04B 45/0015* (2013.01); *G04B 19/12* (2013.01); *G04B 19/30* (2013.01); *G04B 29/027* (2013.01)

(58) Field of Classification Search
CPC ....... A44C 15/004; A44C 27/00; B44C 1/005; C09K 9/00
See application file for complete search history.

(56) References Cited

U.S. PATENT DOCUMENTS

| | | | |
|---|---|---|---|
| 5,972,233 A | 10/1999 | Becker et al. | |
| 6,569,919 B1 * | 5/2003 | Noguchi | C09D 7/67 523/160 |
| 7,476,874 B2 * | 1/2009 | Patel | G01T 1/04 250/474.1 |
| 7,732,011 B2 * | 6/2010 | Gupta | A44C 27/005 427/255.23 |
| 8,758,884 B2 * | 6/2014 | Hiroe | G01D 13/02 428/201 |
| 9,170,419 B2 * | 10/2015 | Charlson | G02B 26/004 |
| 9,545,136 B2 * | 1/2017 | Cochrane | A43B 3/0078 |
| 2005/0185517 A1 * | 8/2005 | Lazaretnik | G04B 37/0083 368/223 |
| 2005/0196626 A1 * | 9/2005 | Knox | C09K 9/02 428/447 |
| 2008/0316423 A1 * | 12/2008 | Boghossian | G02C 7/10 351/158 |
| 2009/0246370 A1 | 10/2009 | Gupta et al. | |
| 2011/0109965 A1 * | 5/2011 | Gates | G02B 30/27 359/478 |
| 2014/0360228 A1 | 12/2014 | Cochrane | |
| 2016/0170376 A1 * | 6/2016 | Francois | G04G 17/08 368/10 |
| 2017/0088737 A1 * | 3/2017 | Nakashima | C09D 11/023 |
| 2018/0138430 A1 * | 5/2018 | Ch | G02F 1/0147 |

* cited by examiner

PROCESS FOR THE SELECTIVE DECORATION OF A TIMEPIECE COMPONENT

The invention relates to a process for manufacturing a timepiece component, said timepiece component being manufactured from a first material.

TECHNOLOGICAL BACKGROUND

Several solutions are currently known for producing colored components for making timepiece parts with a multitude of colors.

A first solution consists in dyeing the material in the bulk. To do this, the material, which is generally a material of plastic type or a derivative thereof, is mixed with a dye when it is in a liquid form. Once mixing has been performed, the material in liquid form is injected into molds to form the components.

A second solution consists in obtaining the component manufactured by injection-molding or machining and in applying a coating thereto. Such a coating may be in the form of a paint or an ink.

However, one drawback of these technologies is that they pose manufacturing process problems. Specifically, passing from one color to another requires cleaning operations between the various colors, without, however, eliminating the risks of pollution between the various colors.

Producing specific patterns such as writing requires the production of a decoration having the desired form, which is assembled with the component. For example, the component comprises a recess having a form identical to that of the decoration so that said decoration can be inserted therein. The drawback of this method is that it is difficult to implement since it requires specific molds.

Customizing may also be performed via the use of processes such as screen printing or pad printing, but these processes require the use of tooling (screen-printing stencil or pad-printing image) which need to be changed to produce different patterns. Furthermore, tooling is necessary for each color desired on the decoration. The tooling items must also require cleaning and maintenance between each manufacturing batch.

Another means is digital printing, but this technique, which requires a machine that is expensive in the industry, can only be applied on two-dimensional substrates (dials, simple bracelets) and is not valid for components with more complex shapes.

SUMMARY OF THE INVENTION

The invention relates to a process for manufacturing a component whose coloring may be total or selective and readily adapted.

To this end, the invention consists of a process for manufacturing a timepiece or jewellery component, said component being manufactured from a first material, the process comprising the following steps:

obtaining the component, said component having undergone, at the very latest during this step, a treatment directed toward combining the component with a chromic element, said chromic element being constituted of at least one pigment that is capable of reacting to an energy supply and of a matrix for binding said pigment;

placing said component in a machine for supplying energy that is capable of at least locally supplying energy to said component;

using the energy supply machine in a predefined operating program so as at least locally to provide energy to said chromic element so as to bring about a reaction of its pigment;

removing the component from the energy supply machine.

In a first advantageous embodiment, the pigment is of the photochromic type.

In a second advantageous embodiment, the pigment is of the thermochromic type.

In a third advantageous embodiment, the pigment is capable of passing from a first color to a second color, the shade of the second color being dependent on the energy level supplied.

In a fourth advantageous embodiment, the pigment used is capable of passing from a first color to at least a second color or a third color, passing to the second color or to the third color being dependent on the energy level supplied.

In another advantageous embodiment, the chromic element is a compound of several pigments, each pigment being chosen to react to a specific energy level.

In another advantageous embodiment, the compound is a mixture of three pigments, a red pigment, a yellow pigment and a blue pigment.

It may be decided, for example to make some "pigments" react locally to create a touch of red, and then to make others react to give a touch of yellow so as to create an orange by additive combination.

In another advantageous embodiment, the matrix is of the hard lacquer type constituted of a binder in which the pigment is mixed, this binder being chosen from the family of acrylics, acrylic copolymers or polyurethanes, a dispersant of the polycarboxylic acid salt type, a plasticizer of the benzoate type, and a solvent chosen from the family of glycols or esters.

In another advantageous embodiment, the matrix is of the supple lacquer type constituted of a binder in which the pigment is mixed, said pigment being chosen from the family of silicones or polyurethanes.

In another advantageous embodiment, the matrix is of the ink type constituted of a binder chosen from the family of acrylics or polyurethanes or silicones; of a dispersant or anti-flocculent agent of the polycarboxylic acid type, a plasticizer and adhesion promoter of sulfonamide type and a solvent chosen from the family of glycols or esters.

In another advantageous embodiment, the first material and the matrix form a single entity, such that the pigment can be integrated directly into said component.

In another advantageous embodiment, the chromic element is a layer at least partially deposited on the surface of said component.

In another advantageous embodiment, the chromic element is in the form of an insert.

In another advantageous embodiment, the energy supply machine is set up to provide light energy.

In another advantageous embodiment, the energy supply machine is set up to provide thermal energy.

In another advantageous embodiment, the energy supply machine is set up to provide the energy at a precise point.

In another advantageous embodiment, the energy supply machine comprises a chamber in which the component is placed, said machine being set up to dispense the energy homogeneously throughout the chamber.

The invention also relates to a timepiece component chosen from the list comprising: bracelet, dial, bezel, middle, bridge, gear train, needle, clasp, crown, push buttons or a jewellery component chosen from the list comprising: earring, bracelet, ring, pendant, necklace, cufflink, brooch.

The invention also relates to a timepiece part comprising at least one timepiece component according to the invention.

BRIEF DESCRIPTION OF THE FIGURES

The advantages of such a dressing element will emerge clearly on reading the description that follows and on examining the drawing which illustrates it by way of example and in which.

DETAILED DESCRIPTION

Figure 1:
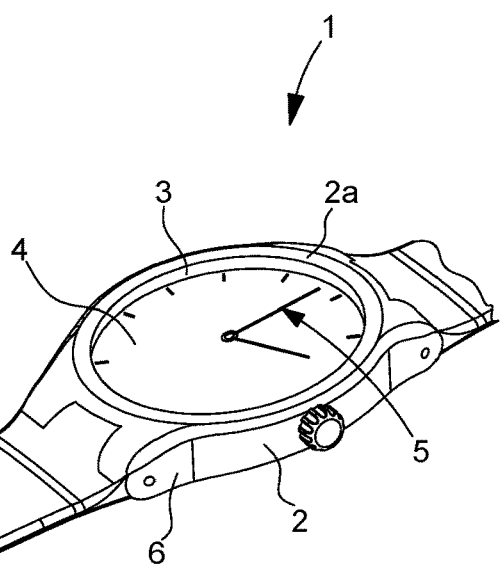
FIG. 1 schematically represents a portable object such as a timepiece part according to the present invention.

FIG. 1 shows a portable object 1 according to the invention, such a portable object being here in the form of a timepiece part. Such a timepiece part comprises a case 2 closed by a glass 3, this case 2 forms a housing in which is arranged an electronic or mechanical or electromechanical timepiece module. The case 2 may also comprise an integrated or rotating bezel 2a. This timepiece module provides at least one item of information to a display module comprising, for example, a dial 4 and needles 5.

This case 2 is also equipped with pairs of horns 6 so as to be able to attach a bracelet 7 thereto, said bracelet possibly being in the form of two strands or of a single strand attached by each end to a pair of horns 6.

Such a portable object 1 is thus equipped with a multitude of customizable timepiece components 10 which may be, for example, the bracelet, the case, the bezel or the dial.

According to the invention, this customizing is irreversible and possible by the combined use of a chromic element 12 and an original manufacturing process.

In a first step, the process consists in obtaining the component that will be colored. To do this, the component undergoes, at the very latest during this first step, a transformation enabling the component to be combined with the chromic element 12.

This chromic element 12 is an element which reacts following a supply of energy and which is constituted of a pigment combined with a matrix.

The pigment used may be of the photochromic type or of the thermochromic type. In the case of a photochromic pigment, the color change takes place after supplying with light energy. This light energy supplied by a natural or artificial light source excites the molecules of the pigment, which then react. This reaction consists of a color change.

In the case of a thermochromic pigment, the color change takes place after supplying with thermal energy. This thermal energy is supplied by a natural heat source such as the sun or the human body or an artificial heat source. This thermal energy excites the molecules of the pigment, which then react. This reaction consists of a color change.

In the case of the present invention which consists in coloring components 10, the pigments used will be of the irreversible type, i.e. the color change is definitive. It is understood that the energy supply suffices to modify the color and that stopping the energy supply does not bring about a return to the initial color of the pigments used.

The matrix of the chromic element 12 consists of support in which the pigment is mixed so as to obtain a chromic element having a consistency which allows it to be combined with the component.

In a first embodiment, the matrix is a matrix of the lacquer or ink type.

In the case of a "hard" lacquer, the matrix may be derived from the family of acrylics or of acrylic copolymers for high scratch resistance and UV resistance or a polyurethane binder for high abrasion resistance, a dispersant of the polycarboxylic acid salt type, a plasticizer of the benzoate type, a solvent of glycol or ester type and other additives such as UV stabilizers for polyurethane so as to prevent degradation of the polymer.

In the case of a "supple" lacquer, the matrix will be derived from the family of silicones or polyurethanes.

In the case of an ink, the matrix is derived from the family of acrylics for high UV resistance and high transparency or from the family of polyurethanes for high abrasion resistance, or alternatively a silicone ink for supple substrates; a dispersant or an anti-flocculent of the polycarboxylic acid salt type, a plasticizer and adhesion promoter of sulfonamide type and a solvent of glycol or ester type.

Figure 2:
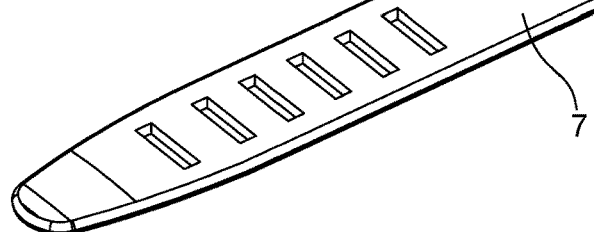
FIGS. 2 to 5 schematically represent various embodiments of the present invention.

This matrix in the form of a supple lacquer or an ink makes it possible, after manufacturing the component 10, to have a step during which said component 10 is covered with a layer 13 of this supple lacquer or ink, as may be seen in FIG. 2. This layer 13 of ink or of lacquer may be deposited by spraying or by passing through a bath or any other suitable process.

Figure 3:
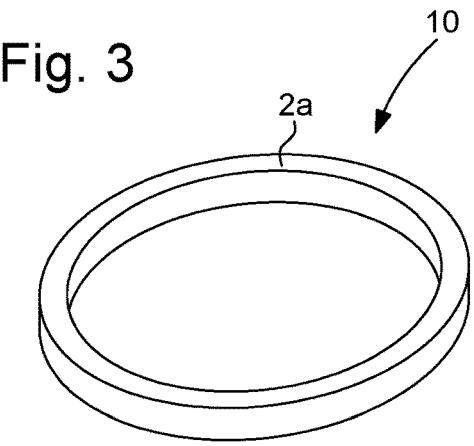
Figure 4:
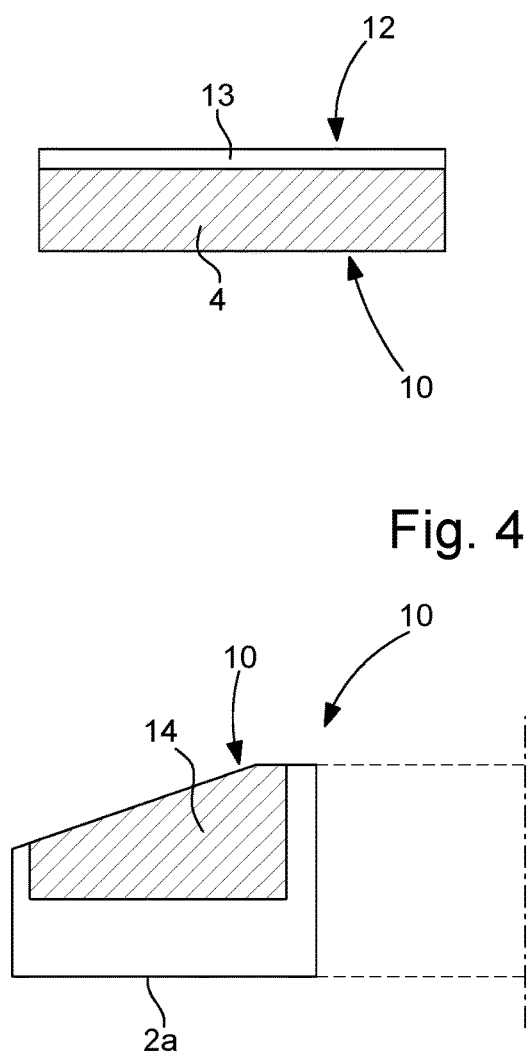
Figure 5:
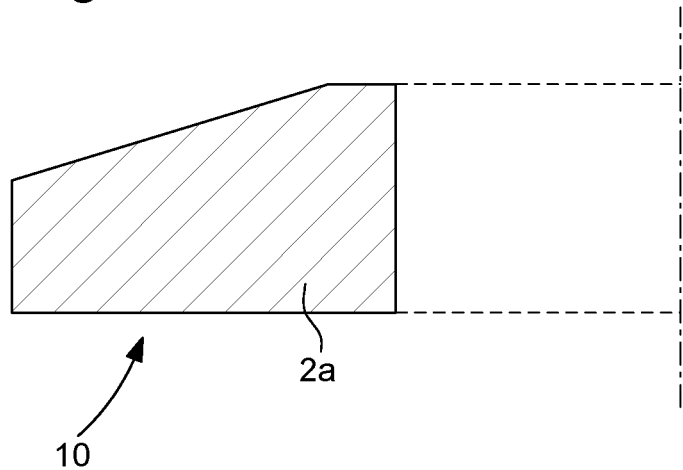

In a second embodiment, the matrix is an insert 14, as may be seen in FIGS. 3 and 4, housed in a housing of the component 10, or the matrix is the component per se, as may be seen in FIG. 5. Specifically, in this case, the matrix is the material which is used for manufacturing the component. Generally, such a material is of the plastic type and is easy to inject or overmold. Such a matrix may be of the thermoplastic type, for instance an acrylonitrile-butadiene-styrene, polyamide or polymethyl methacrylate resin, a dispersant and compatibilizer of modified/grafted copolymer type, a plasticizer of benzoate or sulfonamide type, a thermosetting agent such as a resin of thermoplastic elastomeric epoxy, acrylic or polyurethane type such as a resin of polyurethane type.

The matrix may also be of the elastomer type which is vulcanized, by injection molding, overmolding or compression, for instance an elastomeric resin of nitrile-butadiene or hydrogenated nitrile-butadiene or elastomeric fluoropolymer or silicone type, a vulcanizing system suitable for the selected resin, such as sulfur, and vulcanization accelerators of thiuram or peroxide type and derivatives thereof, and optional coupling agents (of silane type).

In this case, the material serving as matrix and the pigment are mixed before being formed via standard injection molding or overmolding techniques. This results in a finished component, of the plastic type, into which the pigment is directly incorporated.

Once combined with the pigment, the components are stored until the next step begins.

In a second step, the component combined with the chromic element is placed in a coloring machine. This coloring machine depends on the technology used, i.e. on the type of pigment used, but also the desired implementation method.

In a first embodiment, the coloring of the component is total, i.e. the entire surface of the component is colored.

In a second embodiment, the coloring of the component is partial, i.e. coloring is performed only on certain parts in a predefined pattern.

Depending on the embodiment, the machine used for supplying energy to the pigment is different.

Figure 6:
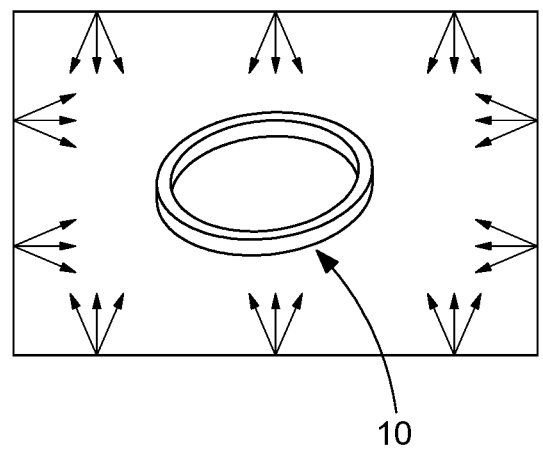
FIG. 6 schematically represents a first embodiment of the present invention.

For the first embodiment, a machine which allows homogeneous energy radiation from all directions, as may be seen in FIG. 6, will be used. This machine may be in the form of a chamber in which the component is placed, this chamber being designed so that the inner walls of which it is composed are all equipped with energy emitters allowing total and homogeneous energy diffusion.

Figure 7:
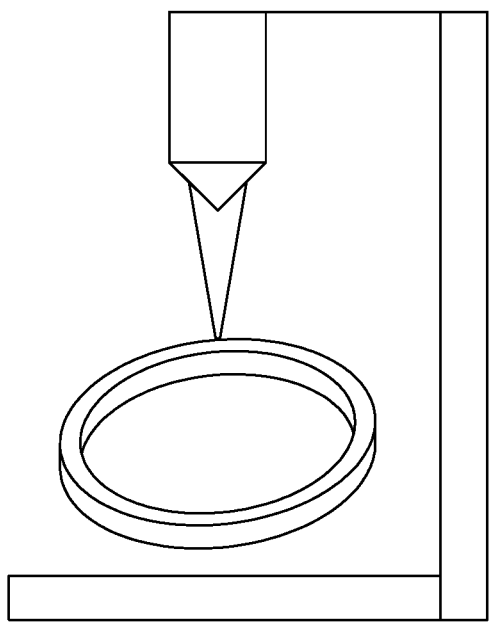
FIG. 7 schematically represents a second embodiment of the present invention.

For the second embodiment, a machine allowing focused energy radiation will be used, as may be seen in FIG. 7. This machine may be in the form of a robot comprising an articulated arm on which is attached an energy-emitting head. This energy-emitting head is designed to supply energy locally.

In a third step, coloring of the component takes place. This coloring step consists in running the machine used for the energy supply in a specific program.

Specifically, it is astutely envisaged for the chromic element to be able to react gradually. This means that the chromic element reacts differently depending on the energy level supplied, so that the more energy is supplied, the stronger the reaction of the chromic element, i.e. of its pigment, and thus the more intense the coloring.

In the case of a chromic element comprising a photochromic pigment, the color variation depends on the power emitted by the light source and the energy received by this chromic element at any point. Thus, as long as the energy received does not affect either the matrix or the pigment, the stronger the light power emitted, the stronger and more rapid the variation in coloring.

In the case of a chromic element comprising a thermochromic pigment, the color variation depends on the thermal energy it receives. This thermal energy corresponds to a temperature increase. Thus, the greater the thermal intensity, the stronger and more rapid the variation in coloring.

Consequently, the programme driving the machine used for the energy supply is designed to supply the amount of energy required for total or partial coloring of the component by modifying the supply time and intensity parameters and also by modifying the position of the supply, for partial colorings.

Thus, in the case of total coloring, the component is placed in the chamber forming the energy supply machine, the inner walls of which are equipped with energy emitters. The coloring program then adjusts the exposure time and intensity so that the entire surface of the component changes from one color to another.

Thus, in the case of partial coloring, the component is placed on the robot forming the energy supply machine. The coloring program then adjusts the exposure time and intensity, but also the position of the energy-emitting head mounted on an articulated arm. This adjustment makes it possible to supply energy to the precise place that is to be colored. Specifically, the partial coloring technique is mainly used for producing patterns such as inscriptions or drawings. Consequently, great precision is required.

It may be envisaged that, depending on the technology used, the focusing point will be larger or narrower in width so as to modify the coloring over a larger or narrower portion.

In the case where the pigments are directly incorporated into the material of the component, one advantage is the durability of the coloring, since the drawbacks of deterioration of a coat of paint are not present.

Once the total or partial coloring has been performed, a next step consists in removing the component from the energy supply machine and in storing it.

In an advantageous variant, the chromic element is designed so as to allow a plurality of color variation. This variant uses a chromic element whose compound is equipped with a plurality of pigments, each pigment allowing a color to be obtained. Thus, it is possible to have a compound which, depending on the energy supply, allows different color variations. This variation of the color is not a variation of the intensity of the color, i.e. a color varying from a pale shade to a vivid shade, but a pigment that is capable of passing from a grey shade to a blue shade or to a red shade or to a pink shade depending on the energy supply. For example, the compound may be an RYB compound, i.e. comprising a red pigment, a yellow pigment and a blue pigment.

Such a variant makes it possible advantageously to improve the flexibility of the manufacturing process. Specifically, given that it is possible to have a plurality of different colors depending on the energy supply, it becomes possible to produce the component in a desired color solely by modifying the energy supply. Consequently, a manufacturing process is obtained, which, starting with a single base, makes it possible to obtain different colorings depending on the energy supply.

Another advantage of this variant is that it allows more extensive customizing. Specifically, if the present invention allows partial or selective coloring and if this variant allows a choice of the coloring color depending on the energy supply, then it becomes possible to perform coloring of the component so that it has a multitude of colors.

In another variant, it may be envisaged for the process according to the invention to be performed during the sale of the portable object comprising the component. Specifically, in the case of a watch, it may be advantageous to offer an on-demand customizing service. This on-demand customizing service consists in allowing clients to modify the esthetic appearance of various components of the portable object according to the invention directly at the time of sale. For example, in the case of a watch, this variant offers the client who has come to buy a watch the possibility of modifying the appearance of his watch to make it unique. The point of sale is then equipped with at least one energy supply machine used to locally or totally modify the color of one of the components of said watch.

It will be understood that diverse modifications and/or improvements and/or combinations that are obvious to those skilled in the art may be made to the various embodiments of the invention presented above without departing from the scope of the invention defined by the appended claims.

Needless to say, the component according to the invention may be a jewellery component chosen from the list comprising: earring, bracelet, ring, pendant, necklace, cufflink, brooch.

The invention claimed is:

1. A process for manufacturing a timepiece or jewellery component, the component being manufactured from a first material, the process comprising:
    obtaining the component, the component having undergone, at a very latest during the obtaining, a treatment directed toward combining the component with a chromic element, the chromic element including at least one pigment of photochromic or thermochromic type capable of reacting irreversibly to an energy supply and a matrix for binding the pigment, the chromic element being a mixture of three pigments, a red pigment, a yellow pigment a blue pigment, each pigment being chosen to react at a specific energy level that is different from the other pigments in order to obtain a plurality of different colors depending on energy supply;

placing the component in a machine allowing focused energy radiation for supplying energy that is capable of at least locally supplying energy to the component;

using the energy supply machine in a predefined operating program at least locally provide energy to the chromic element to bring about a reaction of its pigment; and removing the component from the energy supply machine.

2. The process as claimed in claim 1, wherein the pigment is of photochromic type.

3. The process as claimed in claim 2, wherein the energy supply machine is set up to provide light energy.

4. The process as claimed in claim 1, wherein the pigment is of thermochromic type.

5. The process as claimed in claim 4, wherein the energy supply machine is set up to provide thermal energy.

6. The process as claimed in claim 1, wherein the pigment is capable of passing from a first color to a second color, a shade of the second color being dependent on the energy level supplied.

7. The process as claimed in claim 1, wherein the matrix is of hard lacquer type including a binder in which the pigment is mixed, the binder being chosen from the family of acrylics, acrylic copolymers or polyurethanes, a dispersant of polycarboxylic acid salt type, a plasticizer of benzoate type, and a solvent chosen from the flintily of glycols or esters.

8. The process as claimed in claim 7, wherein the chromic element is in a form of an insert.

9. The process as claimed in claim 1, wherein the matrix is of supple lacquer type including a binder in which the pigment is mixed, the pigment being chosen from the family of silicones or polyurethanes.

10. The process as claimed in claim 1, wherein the matrix is of ink type including a binder chosen from the family of acrylics or polyurethanes or silicones, of a dispersant or anti-flocculant agent of polycarboxylic acid type, a plasticizer and adhesion promoter of sulfonamide type, and a solvent chosen from the family of glycols or esters.

11. The process as claimed in claim 10, wherein the chromic element is a layer at least partially deposited on the surface of the component.

12. The process as claimed in claim 1, wherein the first material and the matrix form a single entity, such that the pigment can be integrated directly into the component.

13. The process as claimed in claim 1, wherein the energy supply machine is set up to provide the energy at a precise point.

14. The process as claimed in claim 1, wherein the energy supply machine comprises a chamber in which the component is placed, the machine being set up to dispense the energy homogeneously throughout the chamber.

15. A timepiece component, manufactured using the process as claimed in claim 1.

16. The timepiece component as claimed in claim 15, chosen from a: case, bracelet, dial, bezel, middle, bridge, gear train, needle, clasp, crown, push button.

17. A timepiece part, comprising at least one timepiece component as claimed in claim 15.

18. A jewellery component, manufactured using the process as claimed in claim 1.

19. The jewellery component as claimed in claim 18, chosen from a: earring, bracelet, ring, pendant, necklace, cufflink, brooch.

* * * * *

UNITED STATES PATENT AND TRADEMARK OFFICE
CERTIFICATE OF CORRECTION

PATENT NO. : 11,259,609 B2
APPLICATION NO. : 15/774035
DATED : March 1, 2022
INVENTOR(S) : Francois It is certified that error appears in the above-identified patent and that said Letters Patent is hereby corrected as shown below:

In the Claims

In Column 7, Claim 1, Line 3, delete "pigment" and insert -- pigment, and --, therefor.

Signed and Sealed this
Thirty-first Day of May, 2022

Katherine Kelly Vidal
*Director of the United States Patent and Trademark Office*